United States Patent [19]

Blaxtan et al.

[11] Patent Number: 5,673,060
[45] Date of Patent: Sep. 30, 1997

[54] DEFORMABLE MIRROR DEVICE DRIVING CIRCUIT AND METHOD

[75] Inventors: Peter William Blaxtan, Welwyn; John David Millward, Ware, both of England

[73] Assignee: Rank Brimar Limited, England

[21] Appl. No.: 50,290

[22] PCT Filed: Nov. 18, 1991

[86] PCT No.: PCT/GB91/02033

§ 371 Date: Sep. 16, 1993

§ 102(e) Date: Sep. 16, 1993

[87] PCT Pub. No.: WO92/09065

PCT Pub. Date: May 29, 1992

[30] Foreign Application Priority Data

Nov. 16, 1990 [GB] United Kingdom ............ 9024978
Nov. 16, 1990 [GB] United Kingdom ............ 9024985

[51] Int. Cl.[6] .................................................. G09G 3/34
[52] U.S. Cl. ............................ 345/84; 345/55; 345/148
[58] Field of Search ........................... 345/84, 98, 99, 345/103, 3, 190, 147, 148, 55

[56] References Cited

U.S. PATENT DOCUMENTS

| 4,740,786 | 4/1988 | Smith | 345/103 |
| 4,832,447 | 5/1989 | Javidi | 350/162.13 |
| 5,189,406 | 2/1993 | Humphries | 345/99 |

FOREIGN PATENT DOCUMENTS 0261901  9/1987  European Pat. Off. .

*Primary Examiner*—Richard Hjerpe
*Assistant Examiner*—Kent C. Lang
*Attorney, Agent, or Firm*—Lerner, David, Littenberg, Krumholz & Mentlik

[57] ABSTRACT

A deformable mirror device having a two-dimensional array of mirror elements is driven in such a way to reduce the data rate and remove the need for buffer stores. The mirror elements are loaded row-by-row in response to an n bit video signal in $2^n$ loading operations. Only n rows are loaded in each loading operation, the other rows remaining in their previous conditions, and the loading continues sequentially down the array. The timing of the loading is such that the duration from loading a given row with a first data bit to loading the same row with the next data bit is proportional to the significance of the first data bit.

14 Claims, 12 Drawing Sheets

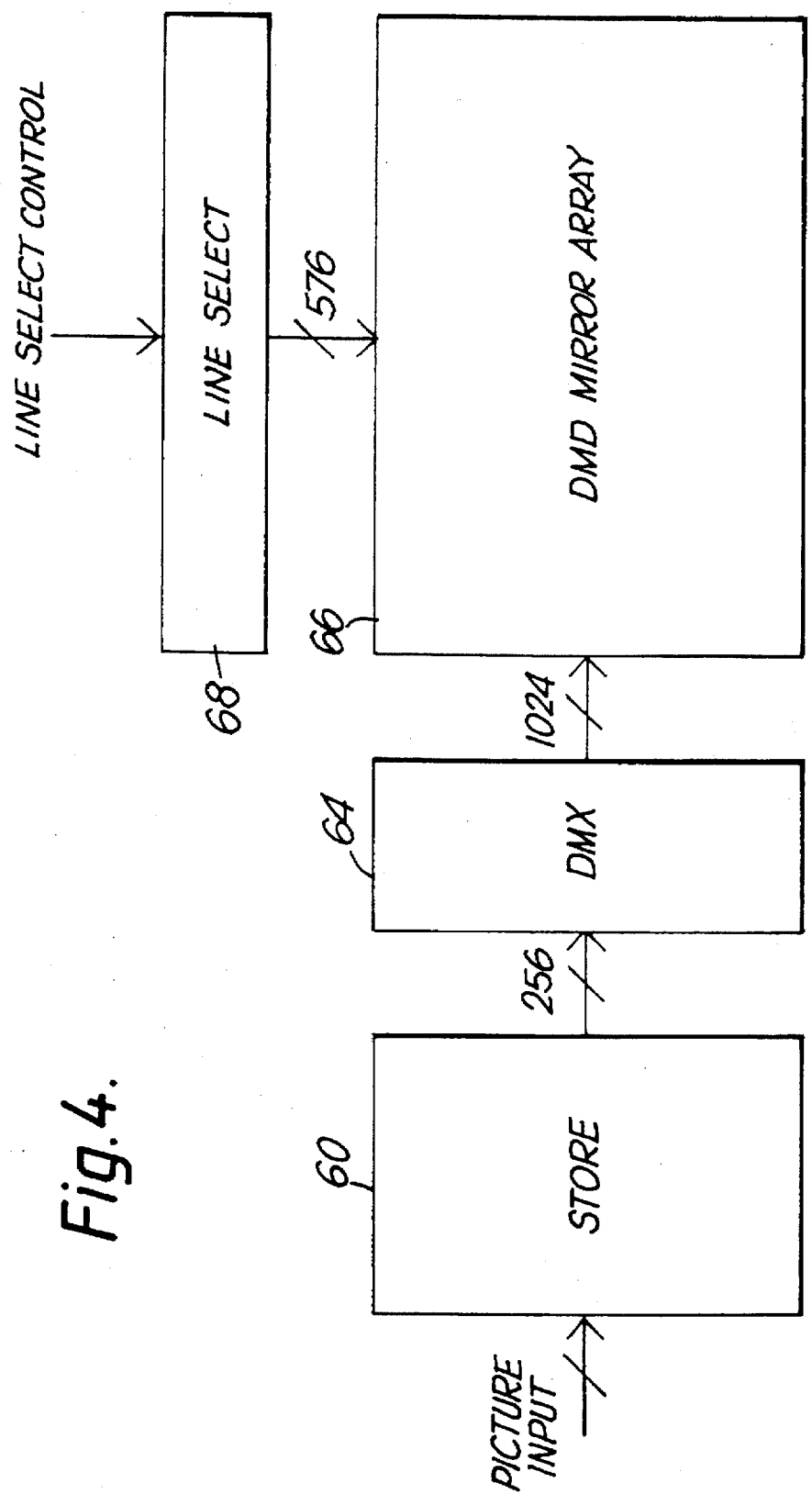

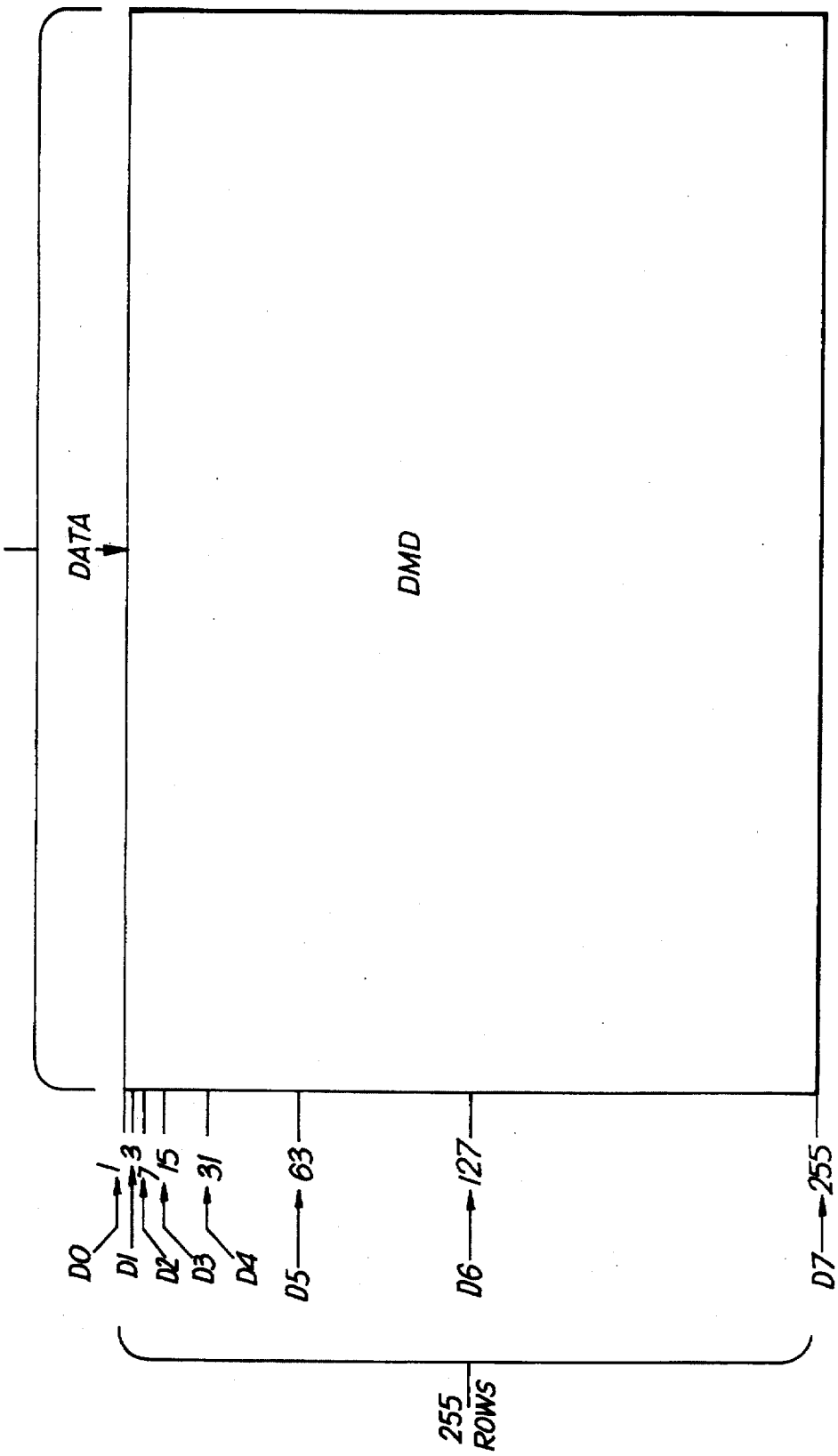

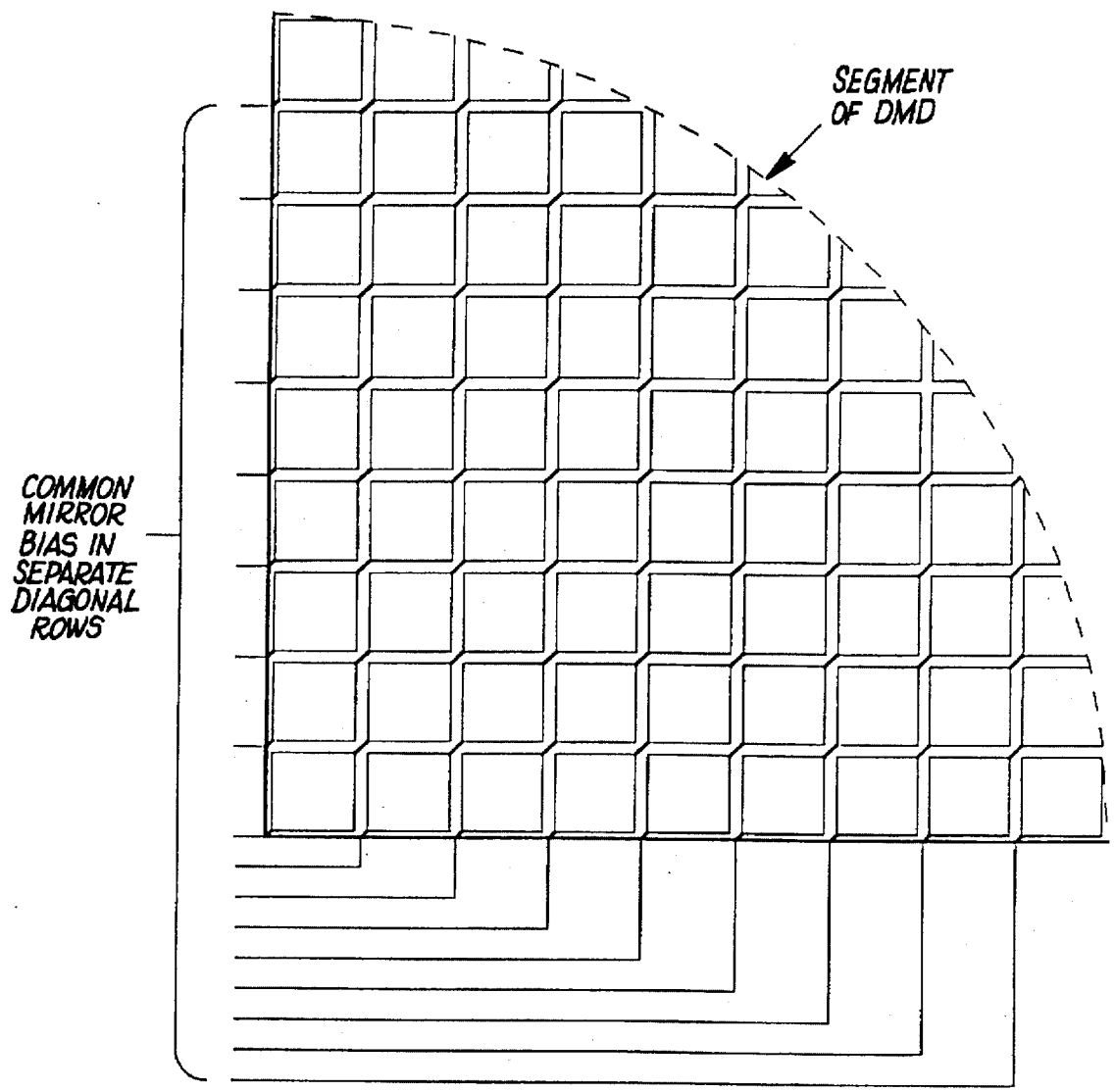

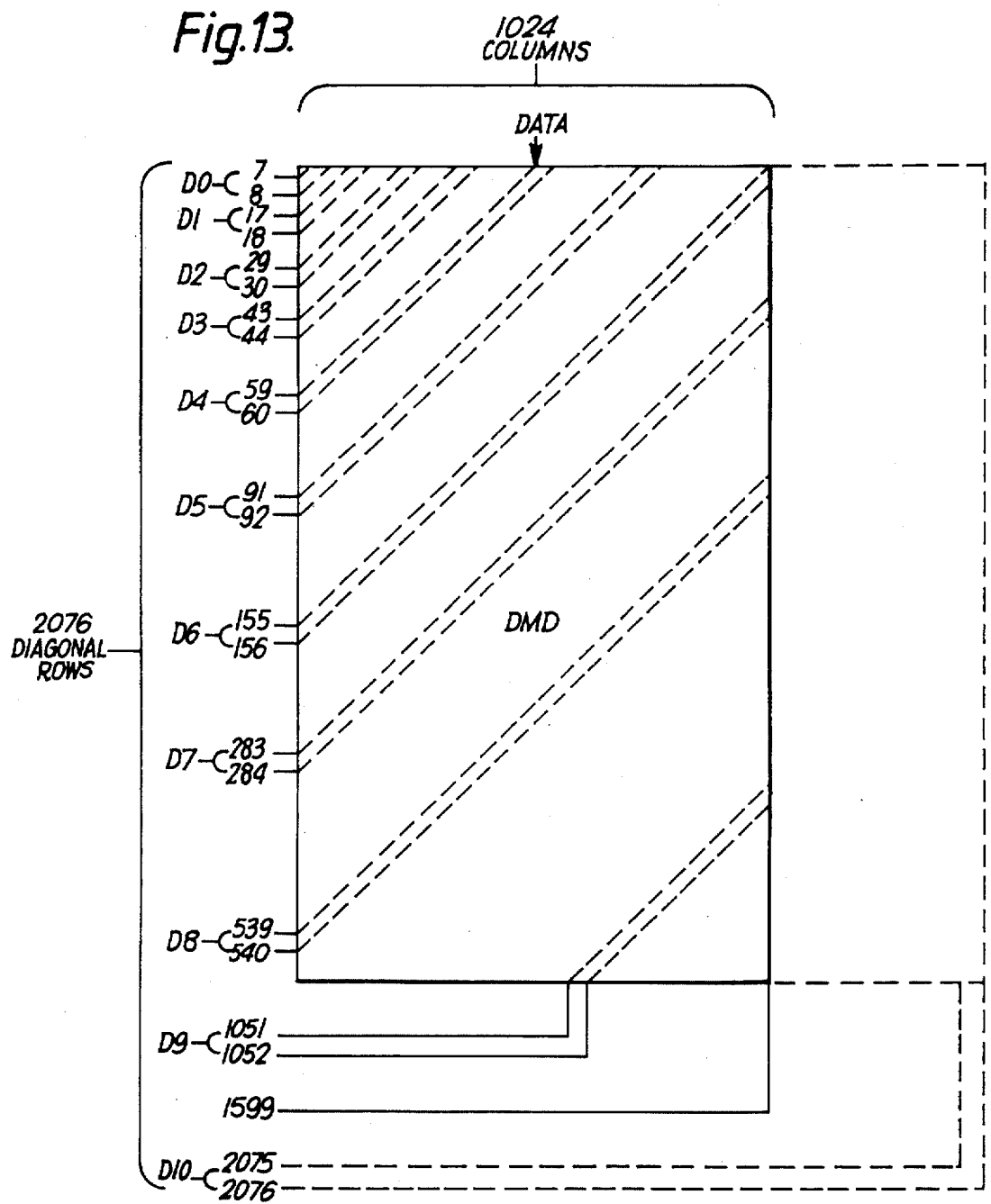

DEFORMABLE MIRROR DEVICE DRIVING CIRCUIT AND METHOD

BACKGROUND OF THE INVENTION

This invention relates to deformable mirror devices, and more particularly to circuits and methods for driving such devices.

The deformable mirror device is a particular type of spatial light modulator and comprises a micro-mechanical array of electronically addressable mirror elements, the elements corresponding to pixels. Each pixel mirror element is capable of mechanical movement in response to an electical input. Such movement is in practice more often a deflection rather than a deformation but the term deformable mirror device has now become accepted as the description of this class of devices. They may be digitally addressed in which case they can be referred to as digital mirror devices. The expression DMD covers all of these.

For a description of current DMD technology reference is made to HORNBECK, L. J., "Deformable-Mirror Spatial Light Modulators" Proc. SPIE Critical Reviews Series, Vol. 1150, 6–11 Aug. 1989, San Diego, Calif., U.S.A., pp 86–102. This paper contains many references to earlier work and attention is drawn particularly to references 3, 9, 14 and 23 of that paper. Further details of the construction of the devices is found in BOYSEL, R. M., "A 128×128 frame-addressed deformable mirror spatial light modulator" Optical Engineering, Vol. 30, No. 9, Sep. 1991, pages 1422–1427. Attention is also drawn to reference 1 in that paper which is an earlier publication by Boysel et al. It has been proposed that DMDs should be usable as projection displays, see e.g. HORNBECK, L. J., et al., "Deformable Mirror Projection Display", SID 80 Digest, pp 228–229 (Abstract of presentation delivered Jul. 20, 1980 at SID Symposium), and U.S. Pat. No. 4,680,579.

The construction and manufacture of DMDs is further described in U.S. Pat. Nos. 4,615,595 and 4,566,935 and European Patent Application EP-A-0 391 529, all of Texas Instruments Incorporated.

The following description assumes a knowledge of the above-noted prior documents, all of which are hereby incorporated by reference.

A DMD may comprise an area array of deflectable mirrors, used to modulate the light in an optical projector. There is one mirror for each picture point or pixel and each mirror is approximately 20 microns square. It is termed digital because each mirror has two positions, an "on" and an "off" position. In the "on" position, incoming light is directed through the projection lens to the display screen, and in the "off" position, light is deflected away from the projection lens, so that no light reaches the screen.

The "on" and "off" positions of each mirror are controlled by two deflection electrodes, which exert an electrostatic attraction on the mirror according to which of the electrodes has been charged with the necessary bias. In addition, there is a common bias applied to all the mirrors, to hold them in their "on" or "off" positions after the potential on the deflection electrodes has leaked away. Therefore the sequence for applying new positional information to each mirror is as follows. Just before the change, the potential on each deflection electrode could be equal, especially if some time has elapsed since the previous change, but the mirrors will remain locked in their previous position because of the common mirror bias. New potentials are now applied to all the deflection electrodes over a relatively short period of approximately 60 to 80 microseconds, but during this time the mirrors stay locked in their previous positions because of the common mirror bias. After all the deflection electrodes have been recharged, the common mirror bias is removed for approximately 10 microseconds and the mirrors are now attracted by the bias present on the deflection electrodes and will change position if (and only if) this bias is different from the previous setting. The common mirror bias then returns which locks the mirrors in the new position until the next time the common mirror bias is removed.

The magnitude of the light from each pixel is controlled by varying the "on/off" mark space ratio, in other words, the proportion of time in a "frame" period for which each mirror is "on". If a picture is to be displayed at 50 "frames" per second, each "frame" period will be 20 milliseconds, and the maximum amount of light would be obtained if a mirror was "on" for 20 milliseconds each frame period. To reduce the number of times the mirrors are reset during a frame period to a sensible number, the "on/off" times follow a binary pattern, a frame period being divided into binary fractions of $\frac{1}{2}$, $\frac{1}{4}$, $\frac{1}{8}$, $\frac{1}{16}$, $\frac{1}{32}$, $\frac{1}{64}$, etc. The use of such a binary series in a display device is known from United Kingdom Patent Applications Nos. GB-A-2014822A and 2164776A. If there are 10 binary fractions (10 bits), it is in principle possible to obtain 1023 levels of brightness from black to maximum brightness, by the suitable selection and addition of the 10 binary fractions, and new information would be injected on 10 occasions during each frame period.

The input picture data sequence is standardised to suit the raster scan of a cathode ray tube, the 10 bits for the first pixel in the top left hand corner arriving first and so on. The DMD mirror array on the other hand requires that all the lower significant bits in the frame are loaded at a different time to the most significant bits, and thus there is a store to re-arrange the data.

The data output rate from the store is constant, but the data into the array is loaded in 10 variable periods and in one case, one bit of the frame data must be loaded in 19.5 microseconds or the fraction $\frac{1}{1024}$ of a frame period. The data rate during this time is much greater than that leaving the store and this is accommodated by "first in/first out" (FIFO) memories. Data is clocked in at a constant rate from the store, and is clocked out in bursts to satisfy the requirements of the mirror array. The FIFO's need to store over half a frame of picture data.

As is seen therefore the DMD's are driven by the use of the first-in first-out (FIFO) stores acting as buffer stores. It would be highly desirable if the need for such FIFO's could be eliminated.

To eliminate the FIFO's, the picture data needs to be applied to the DMD at a fairly constant rate throughout the frame period, but at the same time it must be updated at precisely the right time so that each pixel is illuminated for the correct proportion of the frame period.

SUMMARY OF THE INVENTION

It is an object of the invention therefore to reduce the amount of data that needs to be loaded into the DMD at any given instant.

According to the invention there is provided a method of driving a deformable mirror device having a two-dimensional array of mirror elements, in response to an n-bit digital video input signal, comprising the steps of allocating the mirror elements into m groups; and loading selected groups with one-bit data in a cycle of substantially $2^n$ loading operations, each loading operation comprising loading n selected groups with data, the non-selected groups remaining with their mirror elements in their previous condition, and the groups being loaded in sequential loading operations such that the time from loading a given group with one data bit to loading the same group with the next data bit is proportional to the significance of the said one data bit.

The invention also provides a deformable mirror device provided with a driving circuit adapted to operate in accordance with the method.

BRIEF DESCRIPTION OF THE DRAWINGS

The invention in its various aspects will be described by way of example with reference to the drawings, in which:

FIG. 4 is a block diagram illustrating how the system of FIG. 3 is modified in accordance with the invention;

FIG. 6 is a diagram showing a DMD array and the manner of loading the data into it at a particular point in time;

FIG. 12 shows part of a DMD array in which the common mirror bias is connnected along diagonal rows; and FIG. 13 is a diagram similar to FIG. 6 illustrating the loading of the DMD array of FIG. 12.

DETAILED DESCRIPTION OF THE PREFERRED EMBODIMENT

Figure 1:
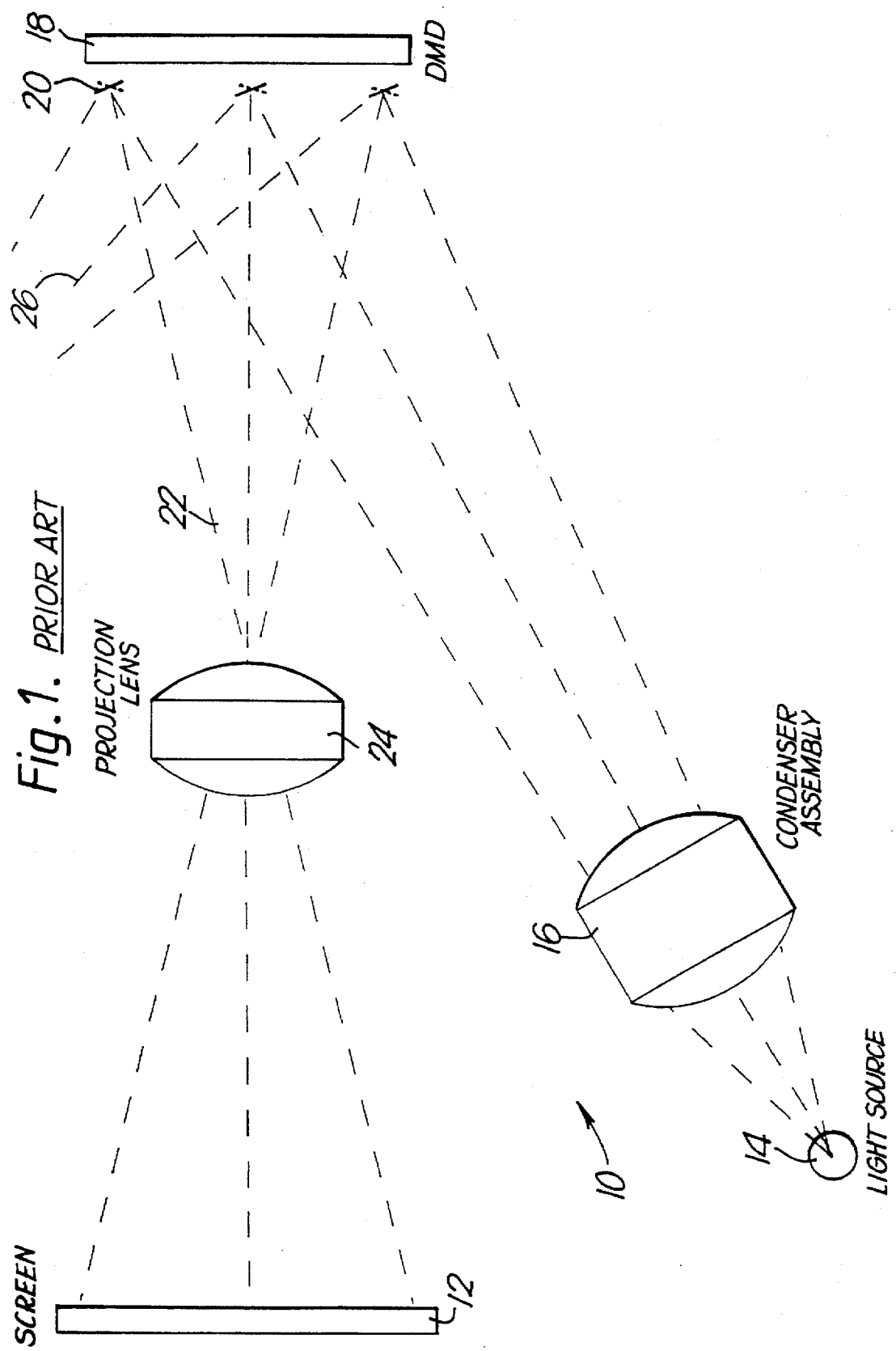
FIG. 1 is a simplified diagram of a DMD with its optical system for a projection system.

A projection display 10 is shown in FIG. 1 which comprises a screen 12 and a powerful light source 14. Light from the light source is collected by an optical condenser assembly 16 and falls on a DMD 18. Each individual mirror element 20 of the DMD has two stable positions, as noted on the figure. In one position, shown in full lines, light is reflected along the path 22 through an optical projection lens system 24 by which it is imaged onto the screen 12. In the other stable position of the mirror element 20, shown in broken lines, light is reflected away from the projection lens system and the screen, as shown at 26. It should be noted that FIG. 1 is not to scale; each mirror 20 is about 20 µm square and they are closely spaced.

At any instant during a display, certain mirror elements 20 will be in their ON position (full lines) and the other mirror elements will be in their OFF position (broken lines), so that the instantaneous picture seen on the display will comprise a black and white picture.

Figure 2:
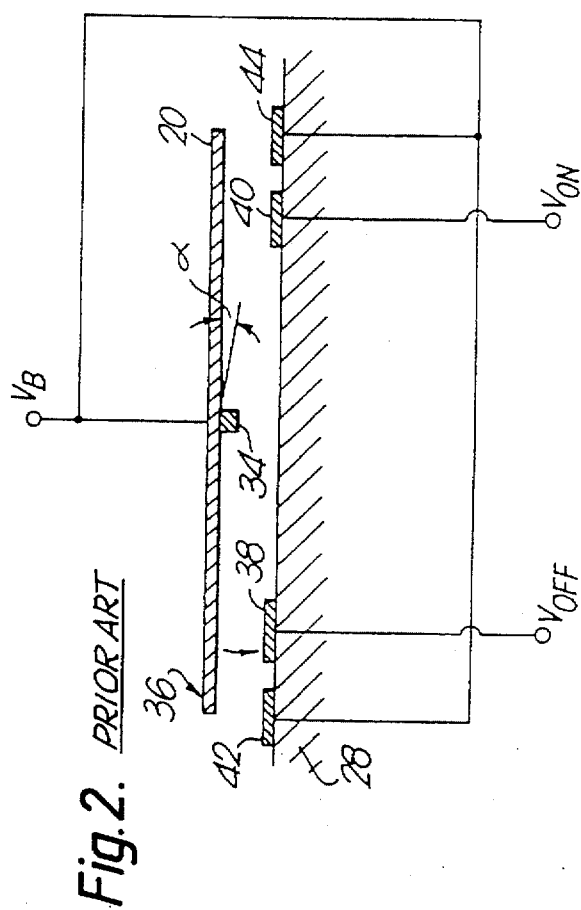
FIG. 2 is a schematic side view of a light modulator mirror element used in one embodiment of the invention.

An individual mirror element is shown in FIG. 2. The element comprises a torsion beam 20 in the form of a plate, supported by a torsion rod 34 which in turn is supported at its ends (not shown). A substrate 28 carries a pair of control terminals 38, 40 (address electrodes) symmetrically disposed around the axis of the torsion beam defined by the torsion bar 34. The control terminals 38, 40 are connected to addressing lines (not shown) and a voltage is supplied to one or other. Also provided on the substrate 28 are a pair of landing electrodes 42, 44 disposed under the edges of the torsion beam mirror element 20. On the outer surface of the torsion beam is a reflective coating 36. The landing electrodes 42, 44 are electrically connected to the torsion beam 20, which is conductive, and is connected to a bias voltage source $V_B$.

Each modulator has individual control terminal lines $V_{ON}$, $V_{OFF}$ connected to the control terminals 38, 40.

In use, generally speaking, the application of a voltage to one control terminal 40 will set up an electric field between the control terminal 40 and the torsion beam 20; the voltage supplied to the control terminal 40 is generally such that the field is attractive. The beam 20 therefore tends to rotate through an angle α towards the control terminal 40 depending upon the magnitude of the field, thus changing the orientation of the torsion beam. The torsion bar 34 tends to resist any such rotation. If the field is sufficiently strong the beam 20 will be drawn to make physical contact with the landing electrode 44; to avoid unwanted discharge the two are connected in common. The magnitude of the attractive field is controlled therefore by the bias voltage $V_B$ applied to the beam 20 and by the voltage applied to the control electrode 40. It would be possible to simultaneously apply a voltage to the other control electrode 38, but in practice this is avoided. Depending on the magnitude of the bias voltage, the torsion beam 20 may have two or three stable positions.

At any instant during a display, certain mirror elements 20 will be in their ON position and the other mirror elements will be in their OFF position, so that the instantaneous picture seen on the display will comprise a black and white picture. In practice, in use the mirrors are flipped back and forth between their ON and OFF positions. Shades of grey can be displayed by varying the mark-space ratio or effective proportion of the time for which a mirror is ON. The mark-space ratio may typically vary from black to white in steps of about 0.05% (some 2000 steps) to provide a high quality display.

For further description reference should be made to the documents cited in the introduction of this application.

Figure 3:
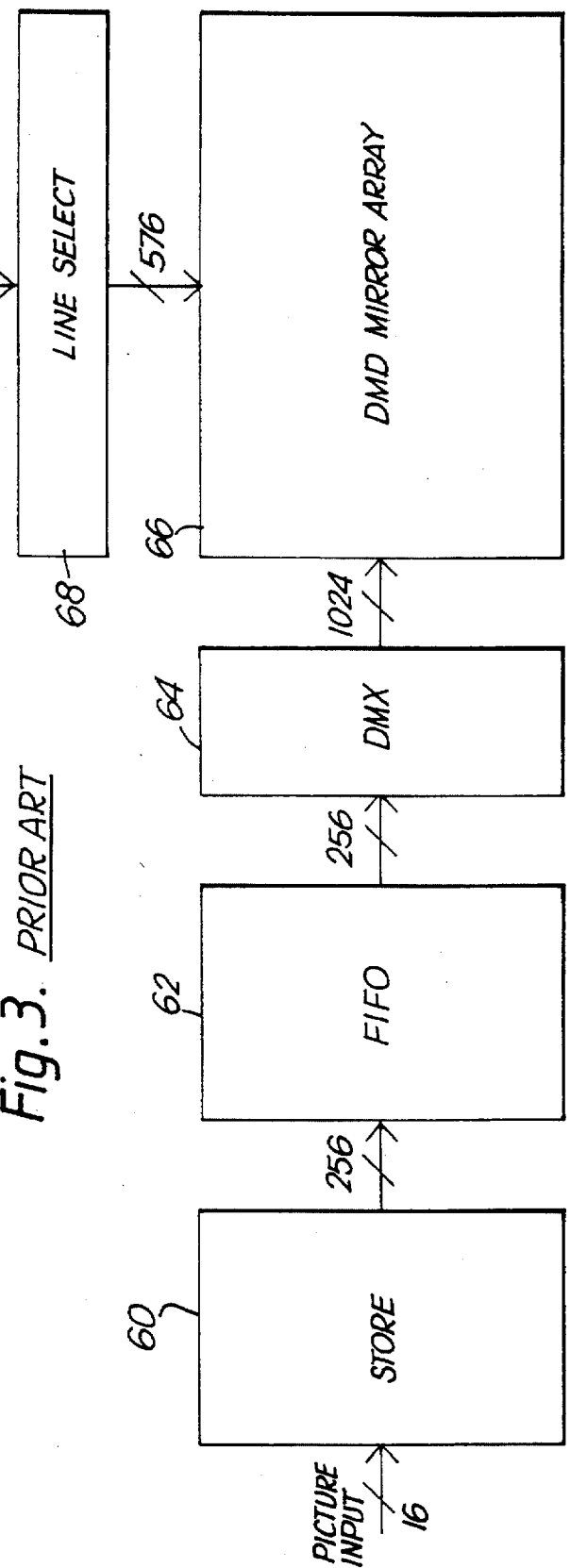
FIG. 3 is a block diagram of a previously-proposed array addressing system.

The manner in which data has hitherto been transferred into the array is illustrated in FIG. 3. The video picture input is applied to a store 60 which re-arranges the data, as the DMD mirror array 66 requires that all the bits of the same significance are loaded at the same time over the whole image, unlike the received video signal which has all the bits of one pixel received together. The store output is applied to a FIFO memory 62 which acts as a buffer because the data is loaded into the array 66 at a variable rate. The FIFO's need to store over half a frame of picture data. A demultiplexer 64 is included to reduce the need for 1024 connectors between the FIFO memories 64 and the mirror array 66, as previously described. The mirror array 66 is controlled by line selection circuitry 68 responsive to a line select signal from a control circuit.

The FIFO memories 64 represent a substantial overhead on the system. In accordance with this invention it is possible to remove the FIFO memories if so desired, by loading the DMD array in a manner which makes it unnecessary to include the FIFO memories. The circuit of FIG. 3 can then be replaced by the circuit of FIG. 4, in which the store 60 is connected directly to the demulitplexer 64, which operates to supply data at a relatively lower and steadier rate to the mirror array 66.

Figure 5:
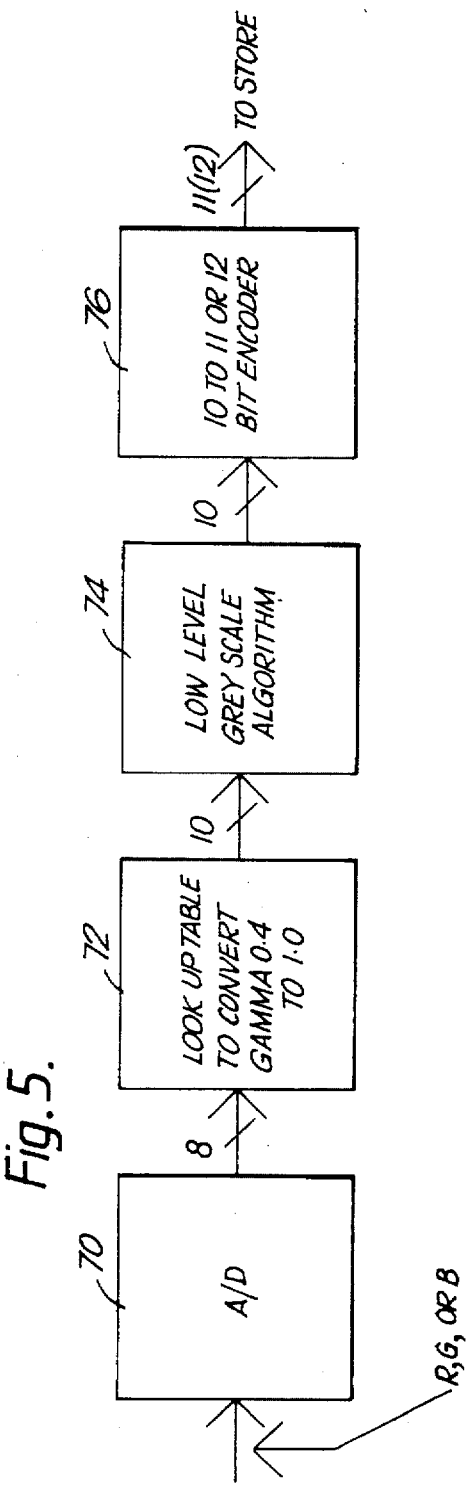
FIG. 5 illustrates the circuitry preceding the store of FIG. 4.

FIG. 5 shows the signal path from the input to the projector to the store in FIG. 4.

The input to the projector is normally three separate analogue signals of red, green and blue and any other type of coded video signal would be converted to R,G,B. There is then identical processing for the three channels and therefore only one needs to be described. An analogue to digital converter (A/D) 70 samples the incoming signal at a rate that coincides with the number of pixels in the mirror array, and since this incoming signal is gamma corrected, which is a universal standard to compensate for the CRT transfer characteristic, 8 bits resolution is satisfactory. The mirror array has a linear characteristic and therefore the 0.4 incoming gamma is converted to unity by a look-up table 72, the output having 10 bits resolution, a minimum requirement for a linear transfer characteristic.

The invention will be described by reference to a preferred example. The method depends on a continuously running sequence which is best described in a simple example shown in FIG. 6.

In this example the picture data has 8 bits grey scale resolution and data is applied to the pixels by selecting one row at a time, which is 1024 pixels in this example, and therefore 1024 bits of picture information can be entered together. Rows could be changed to columns if required, in which case columns would be selected but the present example will assume row selection.

The following example will initially be given in terms of an 8-bit input picture signal or video signal. The bits of the 8-bit video signal as applied to the DMD comprise bits D0 to D7, where bit D0 is the least significant bit having unity value, bit D1 corresponds to 2 units, D2 to 4 units, and so on up to D7 which is the most significant bit and corresponds to 128 units. .Starting from absolute zero time in the sequence, and assuming the rows are numbered 1 to 255 from top to bottom, row 1 is selected and data D7 is entered to the top 1024 pixels. The common mirror bias is then removed which transfers the data to the mirrors. The next row, row 2, is then selected and data D7 entered to the next row of 1024 pixels, the same process being repeated. Since the common mirror bias is connected to all mirrors, the first row of mirrors will also be reset, therefore the original data must be held, either by using a large storage capacitor or a memory cell.

Figure 7:
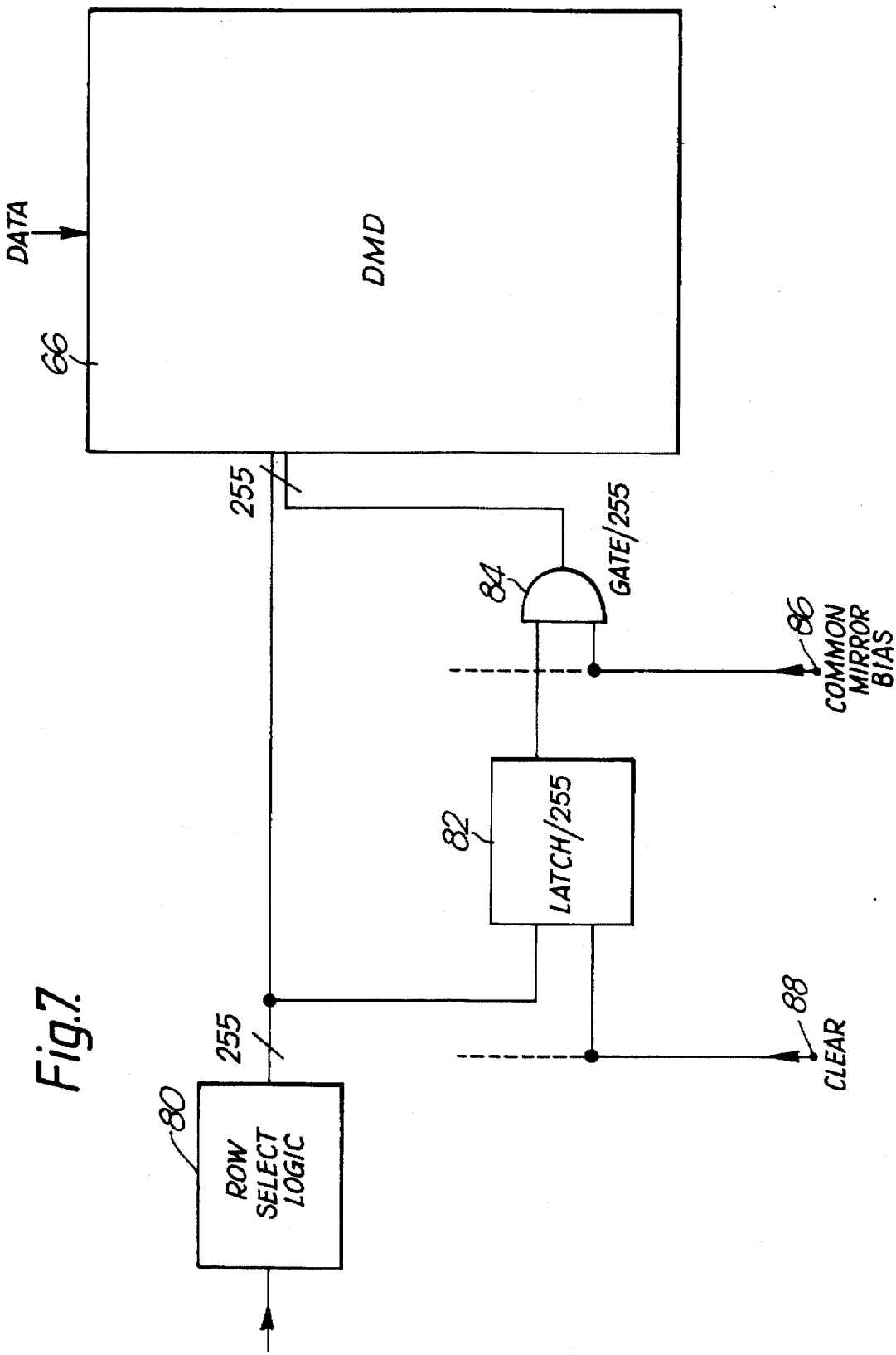
FIG. 7 is a block diagram of circuitry that can be used with a DMD in which the mirror bias can be applied to individual rows.

Alternatively, if it were possible to control each row of mirror bias independently, only those rows of mirrors selected could be reset by means of the logic shown in FIG. 7. As shown in FIG. 7, the rows of the DMD array 66 are selected by row select logic 80, generally of similar type to that used in integrated circuit memories. Each row has an associated latch 82 which remembers whether the row was selected or not, and if so, applies an input to a gate 84. The gate is connected between the common mirror bias input 86 and the bias terminal for the row in question. When a particular row or rows have been selected, the latch 82 enables the gate 84 which allows the common mirror bias to operate on the selected row. The latch is required because only one row can be selected at a time, and as discussed later, several rows will be selected before the common mirror bias is activated. After the activation of the common mirror bias, the latches 82 are cleared by a pulse at an input 88.

Continuing the sequence, data D7 is applied to each row in turn progressively and the mirrors reset. After 128 rows and after data D7 has entered row 129, data D6 is entered in row 1, and after both these rows of data have been entered, the mirrors are reset. At this point two more important parameters, "frame period" and "row period" will be defined. At 50 pictures per second the "frame period" is 20 milliseconds. In this particular example there are 255 "row periods" in a "frame period". Therefore the "row period" is fixed by the picture rate and not by the time taken to select and enter data in in one row, and in fact several rows of data can be entered in one "row period".

Therefore after D7 has entered row 129 and D6 row 1, at the end of this particular row period, the mirrors are reset, which means that row 1 has been updated with D6 after 128 "row periods" of D7 data, or in other words, the MSB has been held for 128 units of time out of a total of 255 units of time in a frame period.

The sequence now continues with data D7 entering row 130 and data D6 entering row 2, and so on progressively until D7 enters row 193, D6 enters row 65 and D5 will now enter row 1, by which time row 1 will have held D6 for 64 units of time. This sequence continues until data D7 enters row 255 and in the same "row period" D6 enters row 127, D5 enters row 63, D4 enters row 31, D3 enters row 15, D2 enters row 7, D1 enters row 3, and D0 enters row 1. This is actually the instant shown in FIG. 6. The maximum data rate input occurs when 8 rows of data are entered in one "row period", which in this example is 78 microseconds approximately. Therefore one row of data will be entered in 10 microseconds and if the 1024 columns of pixels is multiplexed down to 8 columns, the data rate on each input will be 13 MHz approximately.

Continuing the sequence, the 8 selected rows all move on one row, D7 to row 1, D0 to row 2, D1 to row 4 etc., and this process continues ad infinitum, but with the spacing between the selected rows remaining constant at 128, 64, 32, 16, 8, 4, 2, and 1 row, or rows. It is this spacing which determines the length of time each row of pixels stores each bit of data, which in turn controls the light output.

It will be noted that with an n-bit binary input the number of possible groups will normally be less than or equal to $2^n-1$ and greater than $2^{n-1}$.

Thus the DMD array does not operate as hitherto, in which the full frame of one-bit data has had to be loaded into the array during one row period. Instead, the maximum amount of data to be loaded during one row period is eight lines of one-bit data. The remaining rows rely upon the ability of the DMD to remain in the condition in which it was held during the preceding row period, either because the mirror bias is only removed from the rows being loaded, or because the mirror elements remain in their previous positions for the short period during which the mirror bias is removed.

It will be seen therefore that the system works by loading only 8 rows in each row period, and moving the loading operation sequentially or cyclically down the array. The timing of the loading, that is the spacing of the loading operations cyclically on the array, is such that the duration from loading a given row with a first data bit to loading the same row with the next data bit is proportional to the significance of the said first data bit.

In this simple example, 255 rows have been considered which is ideal for 8 bits of input data, but in practice for a 625 line system there would typically be 576 rows and when operating on the 525 line system there would typically be only 484 rows.

One way to operate with 576 rows will now be described.

It has already been shown that the light output is proportional to the spacing of the selected rows, and this spacing remains constant as the row selection progresses through every row. Therefore to retain this constant spacing, which for 8 bits gives a total of 255 rows, the total number of rows must be divided into blocks of 255. There are several ways of doing this of which three will be described.

Figure 8:
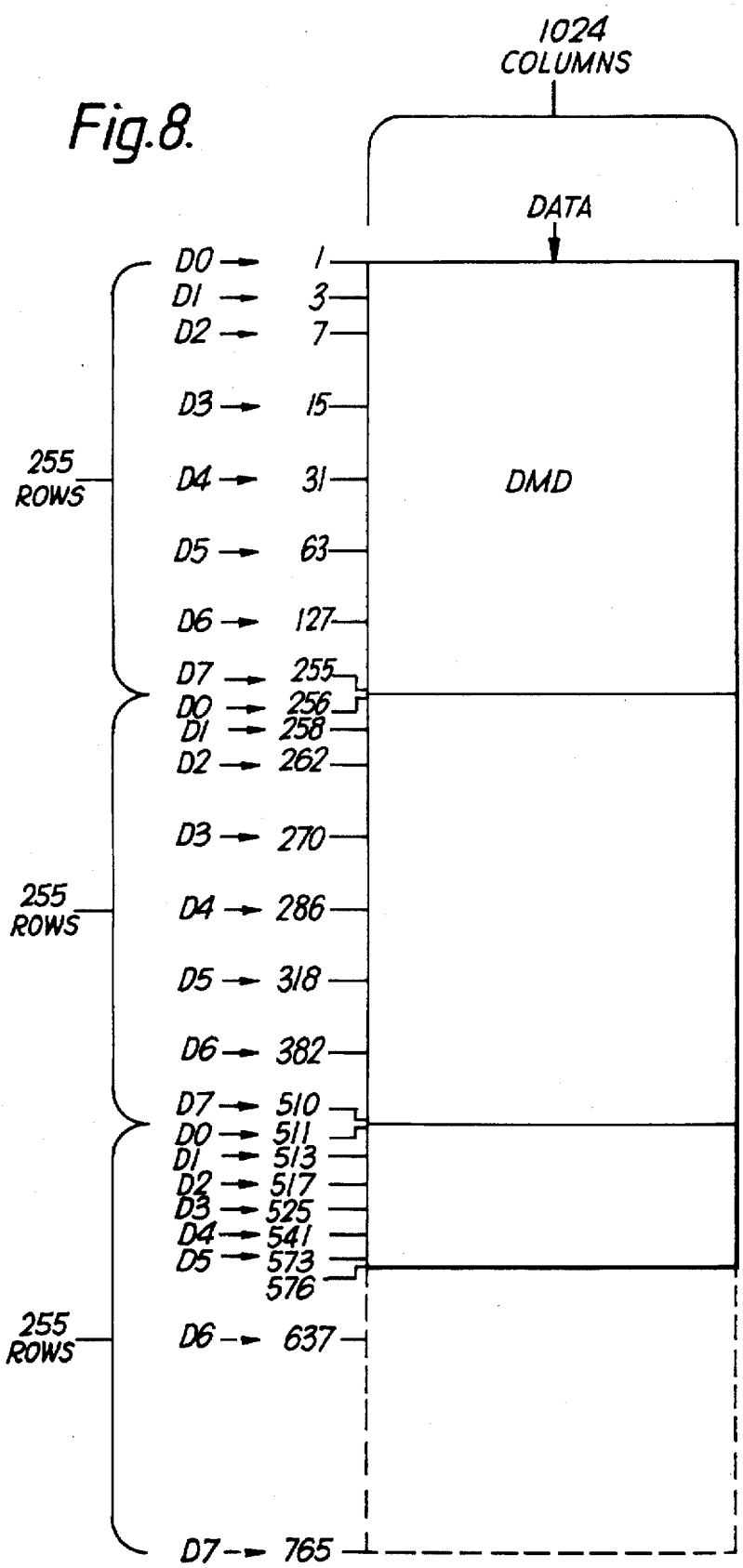
FIG. 8 is a diagram similar to FIG. 6 illustrating one possible way of loading a full-sized DMD array.

FIG. 8 shows the first method where the first 510 rows make 2 blocks of 255, and the remaining rows make a third block of 255 by adding some imaginary rows. Therefore there are 3 separate blocks and the row selection progresses and cycles through each block separately, therefore maintaining the correct spacing. Also in FIG. 8, the row selection sequence is shown at the point when D7 reaches the last row in each block of 255 rows, similar to FIG. 6 and remembering that the imaginary rows are only included to explain the progressive cyclic sequence of row selection. With three blocks of 255 rows instead of one, the input data rate is three times greater and is approximately 20 MHz on 16 inputs.

Figure 9:
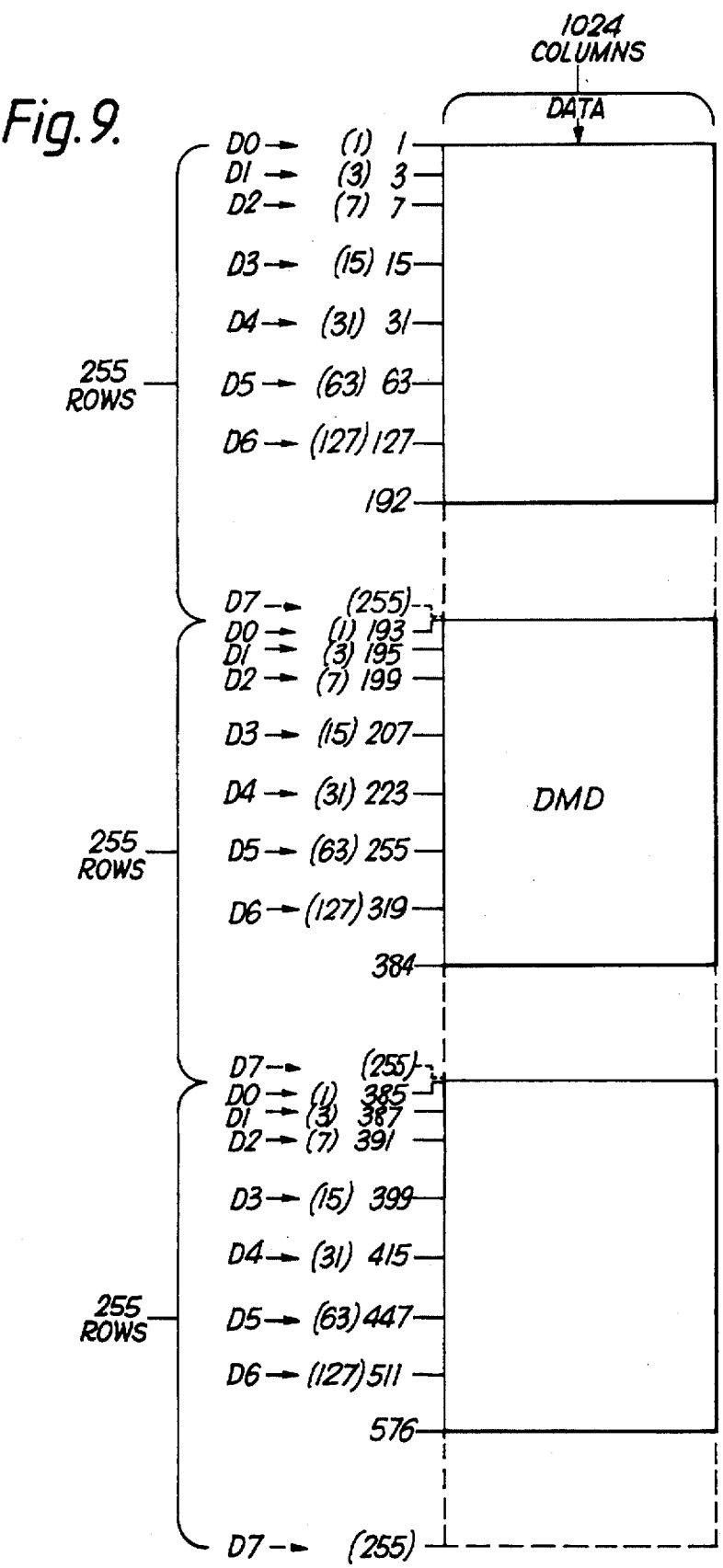
FIG. 9 is a diagram similar to FIG. 6 illustrating an alternative way of loading a full-sized DMD array.

FIG. 9 shows the division of the 576 rows in a different way, again with three blocks of 255 rows but with 192 real rows in each block and 63 imaginary rows in each block, and the selection sequence is shown when D7 reaches the last row, as before.

Figure 10:
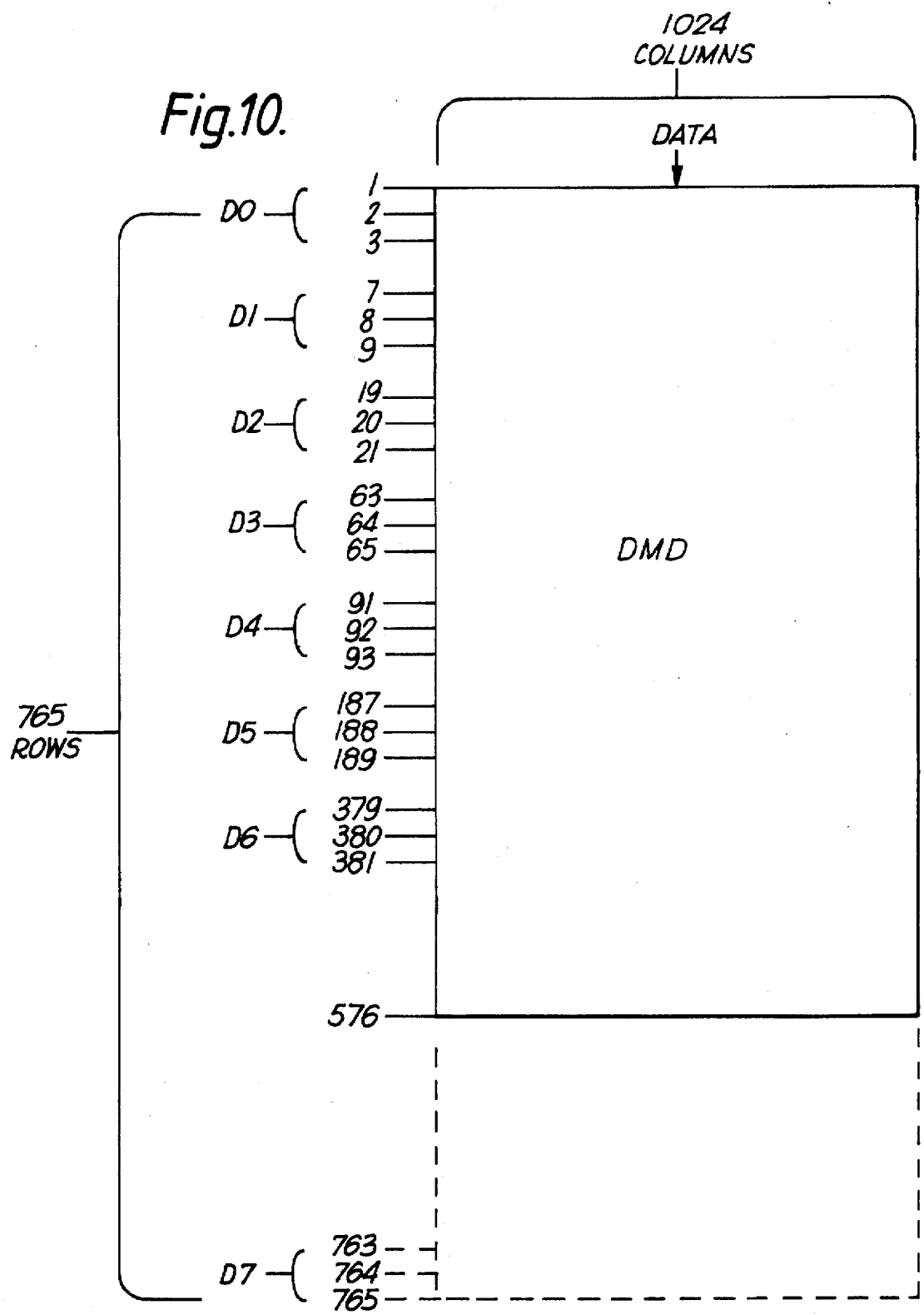
FIG. 10 is a diagram similar to FIG. 6 illustrating a third way of loading a full-sized DMD array.

FIG. 10 shows an arrangement with one block of 765(3× 255) rows, again including some imaginary rows to ease the explanation. In this case, three adjacent rows are selected during the same row period for the same data bit, so that the maximum input data rate is the same as the previous two examples, when 24 rows are selected in one row period. Also the progressive row selection moves forward three rows at a time.

Figure 11:
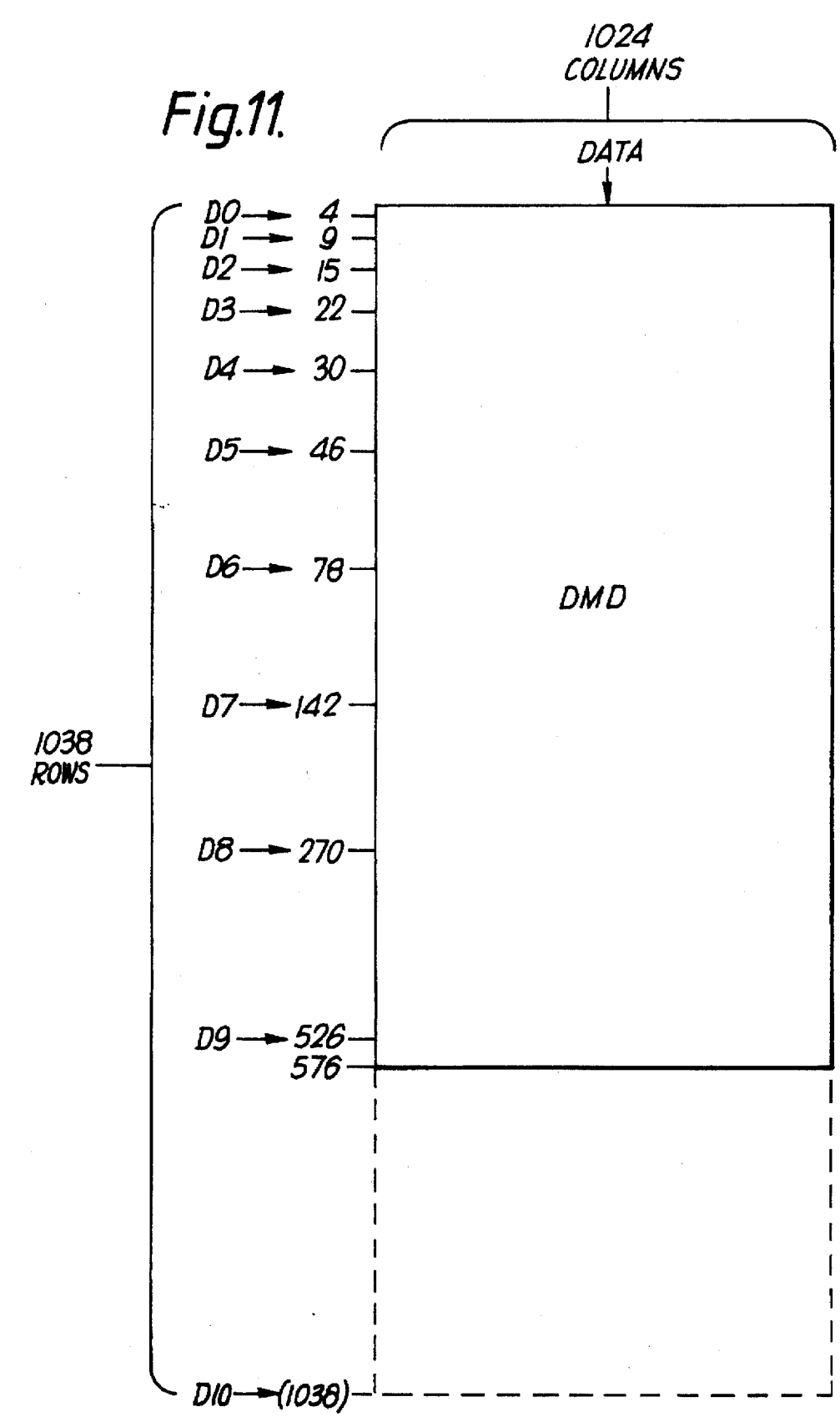
FIG. 11 is a diagram similar to FIG. 6 illustrating the driving of a DMD array with a modified timing sequence.

FIG. 11 shows the arrangement when using 11 bits of data for a 10 bit grey scale system. In that system there were 1038 units of time in a frame period so in this case there is one block of 1038 rows, and the spacing sequence is 4, 5, 6, 7, 8, 16, 32, 64, 128, 256 and 512 rows as described in International Patent Application No. PCT/GB91/02032 (Agents ref: 31678). 1038 rows gives a "row period" of 19 microseconds, and since 11 rows need to be selected in a "row period", the maximum input data rate works out as 19 MHz on 32 inputs. The sequence just described is an example of a modified binary signal in which selected binary values are omitted and additional values between the binary values are included.

As was mentioned earlier, after every row period, all the mirrors are reset unless individual rows of mirror bias can be isolated. If the mirror reset could be applied to selected rows, there would be a double advantage since there is less wear on the mirror hinges, and no requirement for a memory cell greater than one "row period". Unfortunately, because of the close spacing of the mirrors, it is difficult to isolate the mirrors in horizontal rows, especially as the hinges are preferably in the diagonal corners (see the references cited in the introduction). It may be possible to connect the mirrors in separate diagonal rows as shown in FIG. 12, the connections being through the hinges 90, and with a 1024 by 576 pixel mirror array there would be 1599 diagonal rows. Again there are several arrangements that can be made as discussed above, of which only one is shown in FIG. 13. Here there is one block of 2076 (i.e. 2×1038) diagonal rows with lines selected in pairs for the same data bit, based on 11 bits of input data similar to FIG. 11. Again the "row period" is 19 microseconds in which 22 rows are selected and the maximum input data rate is 18 MHz on 64 inputs, a practical proposition.

Further features that maybe used in conjunction with the present embodiment are described in International Patent Applications Nos. PCT/GB91/02032, PCT/GB91/02034 and PCT/GB91/02035 (Agents refs: 31678, 31975, 31978) the disclosure of which is hereby incorporated by reference.

We claim:

1. A method of displaying an image using a plurality of mirror elements in a two-dimensional array, the array having a plurality of sections, each section having a plurality of groups of mirror elements, each mirror element being switchable between an "OFF" state and an "ON" state by application of respective data signals to the mirror elements, a plurality of reset means being connected to a respective different group of mirror elements within a first said section, each said reset means being additionally connected to a respective corresponding group of mirror elements in each of the other sections of the array, the method including the steps of:

selectively activating said reset means to enable data signals to be selectively applied to the mirror elements of said groups connected to said respective reset means, providing a succession of image signals, each image signal being representative of successive image frames, each image signal comprising a plurality of multi-bit numbers each corresponding to a respective different mirror element, the different bits of each said number defining respective different "ON" periods of respective different lengths for the corresponding mirror element so that the multi-bit number represents the light level for the corresponding mirror element in the corresponding frame;

deriving said respective data signals for each mirror element which are representative of said bits for each image frame; and applying said data signals which are representative of each of said different bits defining respective different "ON" periods in sequence to all the mirror elements to be turned "ON" for the corresponding period within each of said corresponding groups of mirror elements connected to each successively activated reset means, until data signals representative of bits representative of all said different "ON" periods of different length have been applied to the mirror elements to be turned "ON" for the corresponding periods in all groups within the array within each image frame.

2. A method according to claim 1, in which said data signals are applied to a plurality of common data signal inputs for respective pluralities of mirror elements in different groups in each section.

3. A method according to claim 1, wherein each of the groups of mirror elements comprises one or more lines of mirror elements.

4. A method according to claim 3, wherein the lines are rows across the array.

5. A method according to claim 3, wherein the lines are diagonal lines across the array.

6. A method according to claim 1, wherein each reset means comprises a latch means, and the latch means is addressed so as to enable the data signals to be applied to the groups of mirror elements connected to said reset means.

7. A method according to claim 6, wherein a common mirror bias is applied to each latch means via a gate means, the gate means being activated to enable the mirror bias to be changed to enable the data signals to be applied to the connected group of mirror elements.

8. A display device for use in a display system comprising:

a plurality of mirror elements in a two-dimensional array, the array having a plurality of sections, each section having a plurality of groups of mirror elements, each mirror element being switchable between an "OFF" state and an "ON" state by application of respective data signals to the mirror elements;

a data signal input means for the mirror elements;

a plurality of reset means each connected to a respective different group of mirror elements within a first said section, each said reset means being additionally connected to a respective corresponding group of mirror elements in each of the other sections of the array, and means for selectively activating said reset means to enable data signals to be selectively applied to the mirror elements of said groups connected to said respective reset means, and means for providing a succession of image signals, each image signal being representative of successive image frames, each image signal comprising a plurality of multi-bit numbers each corresponding to a respective different mirror element, the different bits of each said number defining respective different "ON" periods of respective different lengths for the corresponding mirror element so that the multi-bit number represents the light level for the corresponding mirror element in the corresponding frame;

means for deriving said respective data signals for each mirror element which are representative of said bits for each image frame; and means for applying said data signals to said data signal input means;

wherein said means for applying data signals is arranged such that data signals representative of each of said different bits defining respective different "ON" periods are applied in sequence to all the mirror elements to be turned "ON" for the corresponding period within each of said corresponding groups of mirror elements connected to each successively activated reset means, until data signals representative of bits representative of all said different "ON" periods of different length have been applied to the mirror elements to be turned "ON" for the corresponding periods in all groups within the array within each image frame.

9. A display device according to claim 8, in which said data signal input means comprises a plurality of common data signal inputs for respective pluralities of mirror elements in different groups in each section.

10. A device according to claim 8, wherein each said reset means comprises:

means for holding the mirror elements connected to said reset means in a fixed position by a mirror bias voltage; and said activating means comprises means for temporarily removing the mirror bias voltage to enable said selective application of data signals to the mirror elements of the groups connected to said reset means.

11. A device according to claim 8, wherein each said reset means comprises a latch means effective to allow data signals to be applied to the groups of mirror elements connected to said reset means.

12. A device according to claim 11, further comprising a gate means associated with each latch means and means for activating the gate means to enable the data signals to be applied to the connected group of mirror elements.

13. An address system for a display device comprising a plurality of mirror elements in a two-dimensional array, the array having a plurality of sections, each section having a plurality of groups of mirror elements, each mirror element being switchable between an "OFF" state and an "ON" state by application of respective data signals to the mirror elements, the data address system comprising:

a data signal input means for the mirror elements;

a plurality of reset means for connection to a respective different group of mirror elements within a first said section, each said reset means being additionally arranged for connection to a respective corresponding group of mirror elements in each of the other sections of the array;

means for selectively activating said reset means to enable data signals to be selectively applied to the mirror elements of said groups when connected to said respective reset means;

means for providing a succession of image signals, each image signal being representative of successive image frames, each image signal comprising a plurality of multi-bit numbers each corresponding to a respective different mirror element, the different bits of each said number defining respective different "ON" periods of respective different lengths for the corresponding mirror element so that the multi-bit number represents the light level for the corresponding mirror element in the corresponding frame;

means for deriving said respective data signals for each mirror element which are representative of said bits for each image frame; and means for applying data signals representative of each of said different bits defining respective different "ON" periods in sequence to all the mirror elements to be turned "ON" for the corresponding period within each of said corresponding groups of mirror elements connected to successively activated reset means, until data signals representative of bits representative of all said different "ON" periods of different length have been applied to the mirror elements to be turned "ON" for the corresponding periods in all groups within the array within each image frame.

14. An address system according to claim 13 in which said data signal input means comprises a plurality of common data signal inputs for respective pluralities of mirror elements in different groups in each section.

* * * * *